US009391406B2

(12) United States Patent
Pavageau et al.

(10) Patent No.: US 9,391,406 B2
(45) Date of Patent: Jul. 12, 2016

(54) MEMORY CARD CONNECTOR HAVING SEVERAL CONDUCTIVE PLASTIC PARTS WITH DIFFERENT VALUES OF RESISTANCE FOR DISCHARGING STATIC ELECTRICITY

(71) Applicant: Compagnie Industrielle et Financiere d'Ingenierie "Ingenico", Paris (FR)

(72) Inventors: Stephane Pavageau, La Roche de Glun (FR); Didier Gary, Peyrus (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 14/409,296

(22) PCT Filed: Jun. 19, 2013

(86) PCT No.: PCT/EP2013/062791
§ 371 (c)(1),
(2) Date: Dec. 18, 2014

(87) PCT Pub. No.: WO2013/190006
PCT Pub. Date: Dec. 27, 2013

(65) Prior Publication Data
US 2015/0171559 A1  Jun. 18, 2015

(30) Foreign Application Priority Data

Jun. 19, 2012  (FR) .................................. 12 55750

(51) Int. Cl.
*H01R 4/58* (2006.01)
*H01R 13/648* (2006.01)
*G06K 7/00* (2006.01)

(52) U.S. Cl.
CPC .......... *H01R 13/6485* (2013.01); *G06K 7/0082* (2013.01)

(58) Field of Classification Search
CPC .......................... H01R 13/648; H01R 13/6485
USPC ............................................. 439/88, 95, 108
See application file for complete search history.

(56) References Cited

U.S. PATENT DOCUMENTS 4,747,785 A * 5/1988 Roberts ............ H01R 13/65802
439/465
4,847,711 A * 7/1989 Inoue .................. G11B 23/502
360/137

(Continued)

FOREIGN PATENT DOCUMENTS

EP 1439616 A1 12/2003
FR 2761177 A1 9/1998

OTHER PUBLICATIONS

International Search Report dated Jul. 31, 2013 for corresponding International Patent Application No. PCT/EP2013/062791, filed Jun. 19, 2013.

(Continued)

*Primary Examiner* — Chandrika Prasad
(74) *Attorney, Agent, or Firm* — David D. Brush; Westman, Champlin & Koehler, P.A.

(57) ABSTRACT

A connector is provided for memory card including an insertion module of an overall right-angle parallelepipedal shape. The insertion module includes an insertion slot for inserting a memory card. The connector furthermore includes several static electricity discharge zones coming into contact with a portion of a surface of a memory card upon the insertion of the memory card into the memory card connector. Each of the static electricity discharge zones is made at least in part of a conducting plastic material having a different surface resistance value, so that the discharge of the card is effected progressively in several phases.

9 Claims, 3 Drawing Sheets

(56) References Cited

U.S. PATENT DOCUMENTS

Figure 1A:
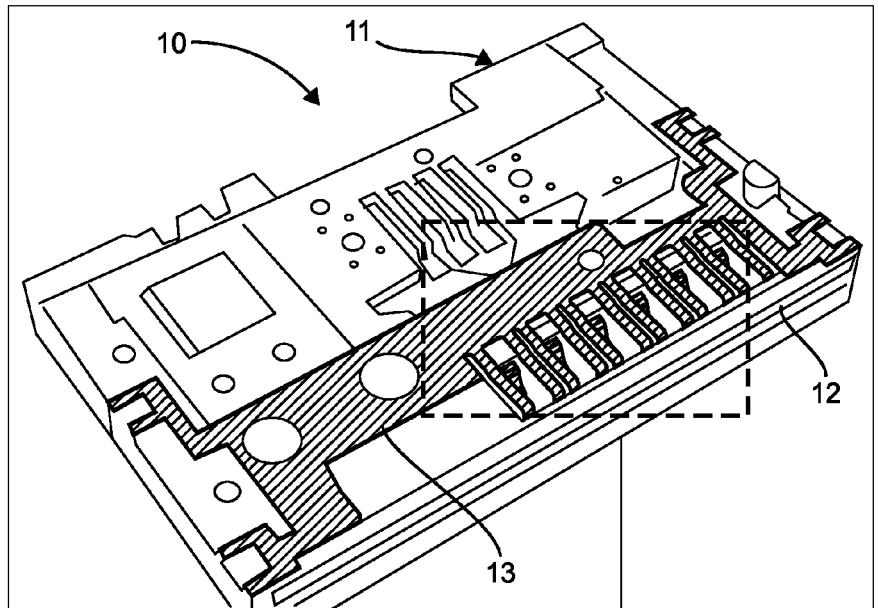
Figure 1B:
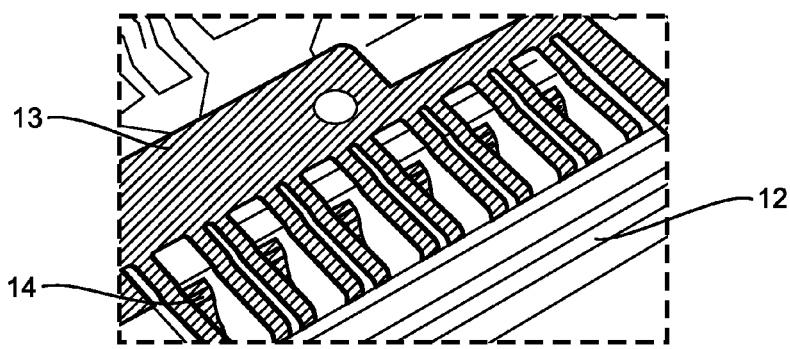
Figure 1C:
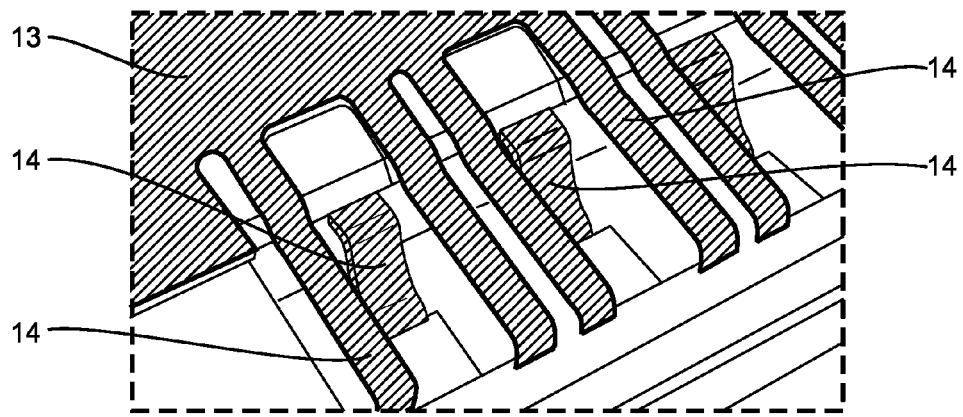
Figure 1D:
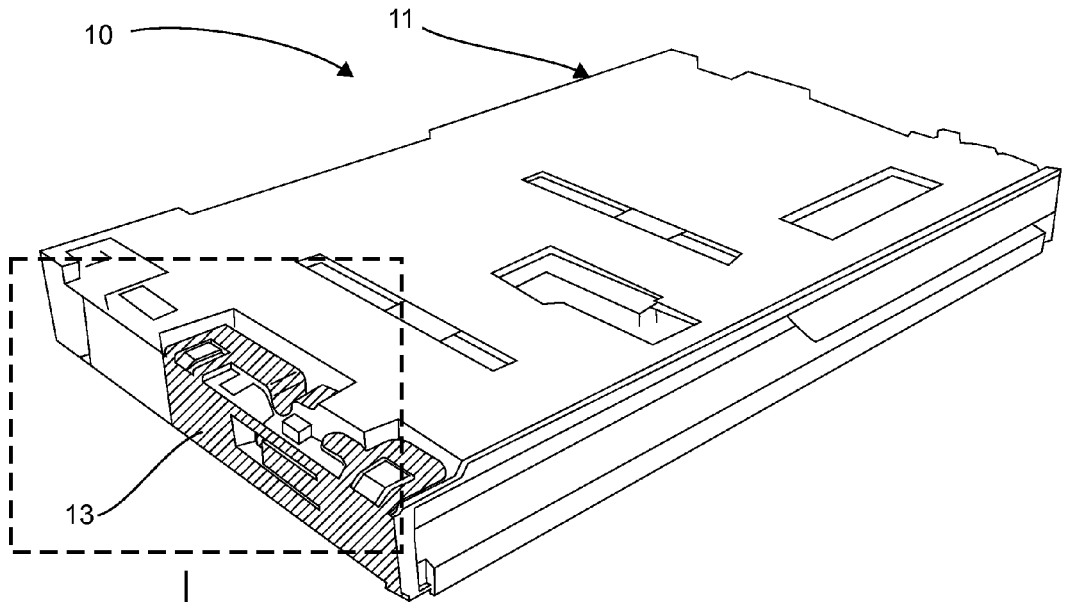
Figure 1E:
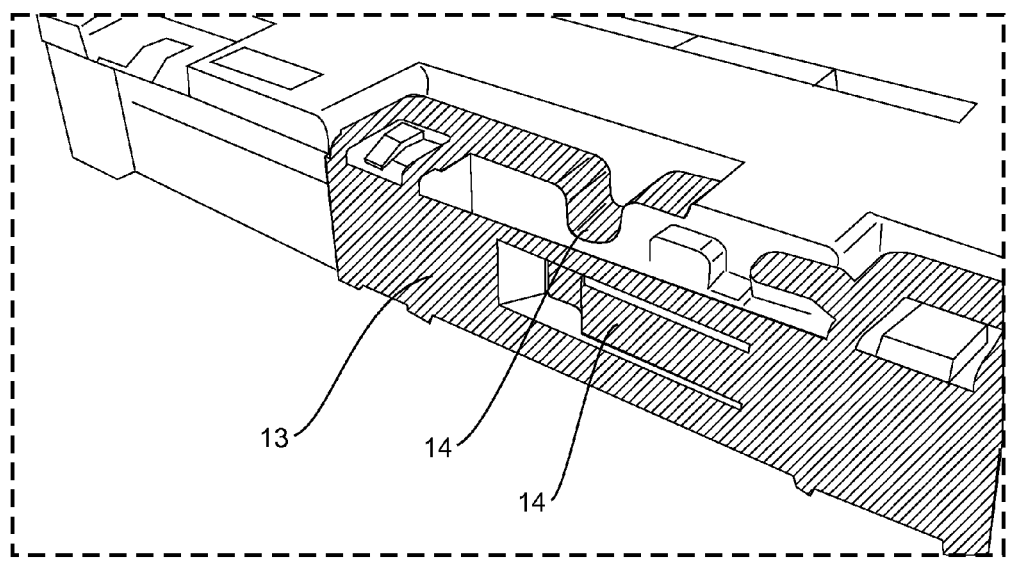

| | | | |
|---|---|---|---|
| 5,889,649 A | 3/1999 | Nabetani et al. | |
| 5,892,216 A | 4/1999 | Grant et al. | |
| 6,231,356 B1 | 5/2001 | Stutts et al. | |
| 6,318,632 B1 | 11/2001 | Grant et al. | |
| 6,537,092 B2* | 3/2003 | Hirai | H01R 13/53 439/181 |
| 6,991,477 B1* | 1/2006 | Hsiao | G06K 7/0082 439/92 |
| 7,227,734 B2* | 6/2007 | Chu | H01H 13/70 361/212 |
| 7,357,642 B2* | 4/2008 | Masubuchi | H01R 13/6485 439/64 |
| 7,972,150 B1* | 7/2011 | Lin | H01R 4/2433 439/607.03 |
| 2004/0257727 A1* | 12/2004 | Chu | H01H 13/70 361/56 |
| 2006/0200976 A1* | 9/2006 | Freund | H01R 13/6485 29/825 |
| 2009/0128982 A1 | 5/2009 | Oshima | |
| 2009/0191757 A1* | 7/2009 | Tochi | G06K 19/077 439/607.31 |
| 2009/0275221 A1* | 11/2009 | Murayama | G06K 7/0021 439/74 |
| 2015/0255904 A1* | 9/2015 | Ito | H01R 12/721 439/88 |

OTHER PUBLICATIONS

English translation of Written Opinion dated Dec. 19, 2014 for corresponding International Patent Application No. PCT/EP2013/062791, filed Jun. 19, 2013.

\* cited by examiner

MEMORY CARD CONNECTOR HAVING SEVERAL CONDUCTIVE PLASTIC PARTS WITH DIFFERENT VALUES OF RESISTANCE FOR DISCHARGING STATIC ELECTRICITY

1 CROSS-REFERENCE TO RELATED APPLICATIONS

This Application is a Section 371 National Stage Application of International Application No. PCT/EP2013/062791, filed Jun. 19, 2013, the content of which is incorporated herein by reference in its entirety, and published as WO 2013/190006 on Dec. 27, 2013, not in English.

2 FIELD OF THE INVENTION

The invention relates to a memory card connector also called an MC connector. A memory card connector is a device enabling the insertion of a memory card. A memory card connector is generally an element comprising a memory card reader terminal. A memory card reader terminal can be, for example, a payment terminal. It can also be a personal digital assistant or again a communications terminal such as a cell phone or a Smartphone.

3 PRIOR ART

There are known memory card connectors for receiving a memory card. The card for example may be, for example, a smartcard which can be a payment card. Payment cards are cards that incorporate means for identifying and authenticating a user in order to enable the performance of one or more actions such as for example a payment, a cash withdrawal, etc.

A payment card often incorporates several means to enable this identification and this authentication of the user. Thus, a payment card may include a magnetic stripe and a chip. Recently, novel means of communication and/or payment have been integrated into the cards: contactless antennas, more powerful chips capable of carrying out special processing operations, etc.

These novel means of communication enable novel types of use: these are for example contactless payment, reinforced authentication processing, etc. At the same time, these novel cards have new drawbacks: these cards, known as new generation cards, tend to get electrically charged to a far greater extent than do the earlier cards. Now, electrically charged cards present at least one problem: the electrical charge that builds up in the card must be discharged at some time or other. In one frequent scenario, the card gets discharged when it is being inserted into the terminal. The discharge into the terminal causes two possible results: either the card gets discharged in the terminal or the charge is conducted to the chip integrated into the card. In the former case, the terminal can be seriously damaged. In the latter case, it is the card that can be damaged. In any case, the discharge takes place from the highest potential towards the lowest potential, generally the ground, and with intensities that are generally high. If the part through which the current passes (the chip of the card, the terminal) is sensitive to these intensities, then the terminal and/or the card can be damaged.

Solutions have been proposed to overcome this problem. They are of several types: integrated solutions and corrective solutions. They rely on the same approach: discharging the electrical charge when the card is inserted into the memory card connector. There also exist corrective type actions using electronic components (or the terminal or the smartcard) that are more resistant to strong currents.

One classic prior art solution is described with reference to FIGS. 1A, 1B, 1C, 1D and 1E. These figures are isometric representations of an existing memory card connector comprising an integrated discharging solution. A memory connector 10 comprises a casing 11 and an insertion slot 12 for receiving the memory card. In addition to this casing 11, the memory card connector comprises a metal part 13 comprising pins 14. These pins 14 are inserted into vacant spaces of the casing 11. These metal pins come into contact with the card when it is inserted into the memory card connector. For the discharge to be complete, the pins come into contact with the card in several places: at the chip, the edge of the card and on the face of the card not having the chip. Thus, when it is inserted, the card is at least partly discharged. Indeed, the metal part 13 is connected to the ground of the terminal and the electrical charge of the card is discharged before the chip comes into contact with the pins of the memory card connector.

Corrective solutions work according to the same principle: one or more metal parts, connected to ground, are added to an existing memory card connector to enable the discharging of the charge. This operation is also complex since it requires the creation of several metal elements on the basis of an existing memory card connector. Now, the creation of such mechanical elements is complex and costly.

However, although they theoretically resolve the problem of removing charge, these prior-art solutions raise yet other problems. Firstly, in the case of the integrated solution, the designing of the memory card connector is complex. It is indeed necessary to design a first part, the casing, for example out of injected plastic, and then adjoin a metal part to the rim of the casing. This metal part, therefore, needs to have been shaped beforehand with numerous folds so that the pins can take position in the vacant spaces of the casing. This mounting operation is costly.

Furthermore, another problem common to both prior-art solutions is linked to the fact that the metal pins could damage the card when it is withdrawn. Indeed, the metal pins are abrasive parts that rub the card with varying degrees of intensity. Now, by being continually rubbed, a card can be damaged.

In short, in the prior-art solutions, the contact is made with relatively low resistance and the addition of a resistor in a series connection takes up a great deal of space. This causes the current of the discharge to remain high and can therefore create damage to sensitive components.

In addition, the contact with the memory card is done on at specific, separate instances, on zones defined by the position of the pins. Although these zones are numerous, this does not make it possible to cover each and every smartcard configuration.

Finally, the basic solution of adding a strip (the corrective solution) requires the addition of an additional part, and this generates costs.

Thus, the existing solutions are not satisfactory and novel solutions without the drawbacks of the prior-art solutions need to be proposed.

4 SUMMARY OF THE INVENTION

The invention does not have these drawbacks of the prior art. Indeed, the invention relates to a memory card connector comprising an insertion module or insert with a generally rectangular parallelepiped shape, said insertion module comprising a memory card insertion slot.

According to the invention, such a connector furthermore comprises at least one zone for discharging static electricity coming into contact with a portion of a surface of a memory card during the insertion of said memory card into said memory card connector, said zone for discharging static electricity being constituted at least partly by a conductive plastic material having a predetermined value of surface resistance.

Thus, the invention makes it possible to avoid the addition of metal discharge zones which have an abrasive effect on the cards that are inserted into the memory connector.

According to one particular characteristic of the invention, said predetermined value of surface resistance ranges from $10^7$ Ω/square to $10^{12}$ Ω/square.

According to one particular characteristic of the invention, said predetermined value of surface resistance ranges from $10^5$ Ω/square to $10^8$ Ωsquare.

According to one particular characteristic of the invention, said predetermined value of surface resistance is of the order of $10^7$ Ω/square.

According to one particular characteristic of the invention, said predetermined value of surface resistance is of the order of $10^8$ Ω/square.

According to one particular embodiment of the invention, said electrostatic discharge zone is formed by the totality of said memory card connector.

Thus, the invention avoids the adjoining of a complementary device. The memory card connector carries out the discharging of the card by itself. According to one particular embodiment of the invention, said electrostatic discharge zone is a conductive plastic part placed at said insertion slot, said conductive plastic connector comprising a linking rod connecting said conductive plastic part to at least one ground connection of said connector.

Thus, the invention enables the addition of a discharge zone that is not complex to implement or to manufacture.

5 DRAWINGS

Figure 2:
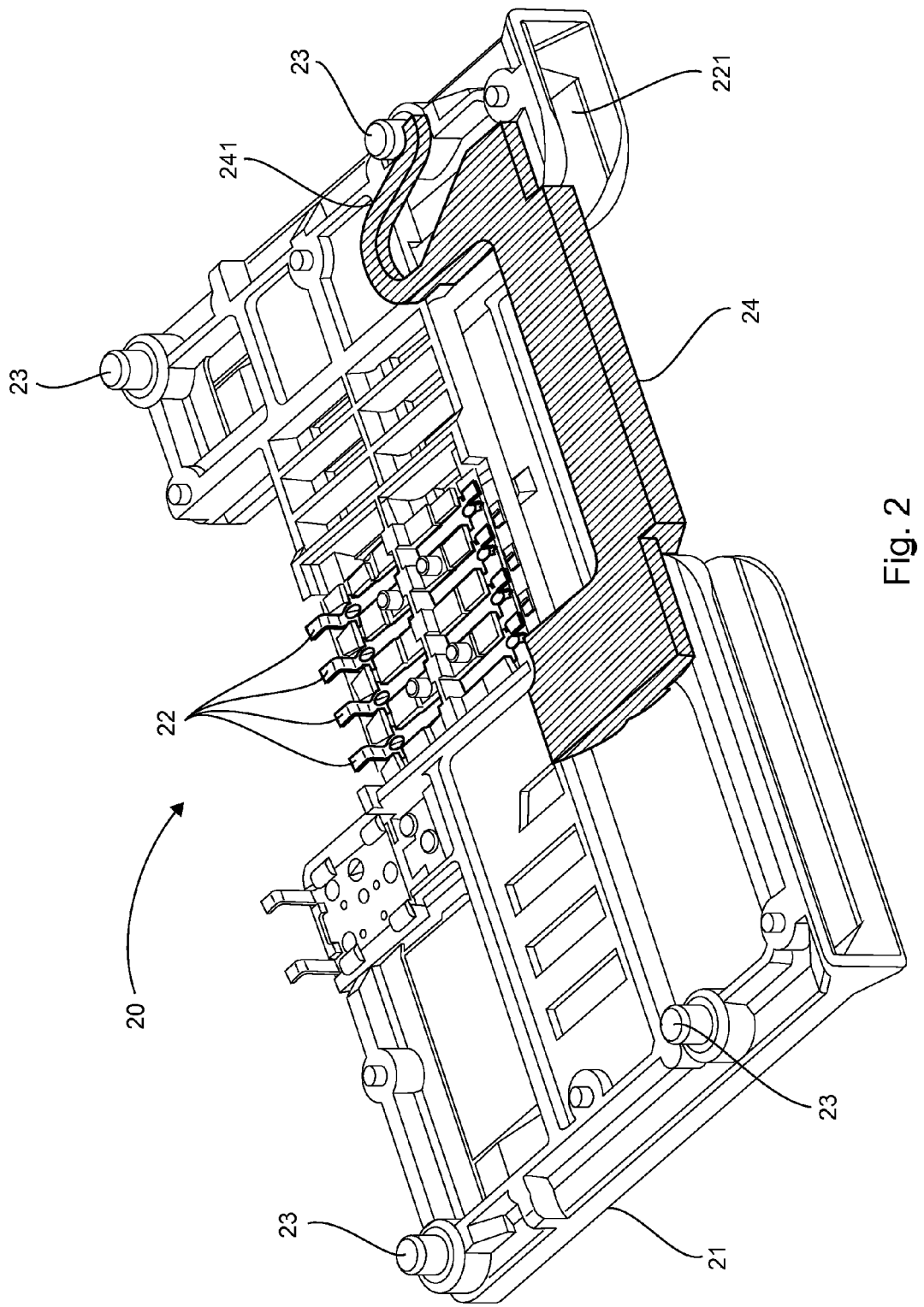

Other features and advantages of the invention shall appear more clearly from the reading of the following description of a preferred embodiment, given by way of a simple illustrative and non-exhaustive example and from the appended drawings, of which:

FIGS. 1A, 1B, 1C, 1D and 1E, already commented upon, illustrate a connector and a discharge device according to the prior art;

FIG. 2 illustrates one embodiment of the invention.

6 DESCRIPTION OF THE INVENTION 6.1 General Presentation

As explained here above, the general principle of the invention is that of proposing a smartcard connector that directly integrates the card discharge means. More particularly, the card discharge means of the invention are an integral part of the memory card connector. This greatly simplifies the designing of this connector and extends the service life of the inserted cards.

It is thus no longer necessary to add metal parts that enable the discharging of the card. The manufacturing of the memory card connector is therefore made easier. Besides, since the use of metal parts is not necessary with the invention, there is no risk of deterioration of the card when it is inserted or removed. The integrity of the card is therefore ensured. In addition, even in the case of corrective implementation, the invention does not require a major modification of the memory card connector. All that is needed is to add a part made of conductive plastic material. This is appreciably simpler than adding a metal strip.

Such results are made possible according to the invention by the use of a semiconductor plastic to design the memory card connector. Naturally, the contribution of the invention is not limited to the use of a conductive plastic material. However, this design, which has been conceived by the inventors, has proved, during trials, to be far more efficient than anticipated. Indeed, the users felt that such a design could not meet problems of discharge. However, it has turned out that this design perfectly meets the problem and is simpler than the existing solutions.

As mentioned, in order to reduce problems related to the addition of metal parts to the memory card connector, the invention proposes to build said memory card connector by using a connector at least partly made out of conductive plastic.

The embodiments of the invention have characteristics suited to resolving the problems faced by the invention.

Indeed, in order to enables a full discharge of the card, according to the embodiment, it is not sufficient to build the memory card connector partly with conductive plastic material.

Thus, depending on the embodiment, it is important to define a value of surface resistance for the conductive plastic part. This value of resistance is expressed in Ω/square. The volume resistance is expressed in Ω/m (or Ω/cm). The surface resistance (which is important for the invention) is expressed in Ω/square. These terms related to "resistance" are commonly used by those skilled in the art.

It varies depending on whether the entire memory card connector or only a portion of it is conductive. Here below, we present especially the case of two embodiments. It is clear however, that the invention is not limited to this particular application but can also be implemented in numerous other embodiments and more generally whenever the advantages procured by the invention are of interest.

6.2 Description of Embodiments 6.2.1 First Embodiment

In a first embodiment, the memory card connector is equipped with a specific, relatively conductive part connected to the ground of the terminal. The resistance of this part is relatively low (of the order of a few hundreds of ohms). This is a configuration requiring little investment in terms of design. All that is necessary is to build a part that gets fixed to the memory card connector. This part is connected to the ground of the terminal.

In this first embodiment, the part can be either over-molded or mounted subsequently (in the latter case, the material used does not need to have a very high temperature performance since it is not mounted on the surface of the printed circuit).

Referring to FIG. 2, we present a first embodiment of a portion of a connector for a memory card according to the invention.

The memory card connector 20 comprises an insertion module 21 with a generally rectangular parallelepiped shape. This insertion module 21 comprises an insertion slot 221 enabling the insertion of the card. The memory card connector 20 also comprises metal pins 22. These metal pins 22 are positioned so as to come into contact with the contact zones of the chip situated on the card. In this embodiment, eight metal pins are used. The memory card connector 20 also comprises four pads 23 that are to be fixed a PCB receiving the memory card connector. In this embodiment, these four pads 23 are also connected to the ground of the terminal (by means of the PCB).

According to the invention, in this embodiment, the memory card connector 20 additionally comprises a conductive plastic part 24 positioned on the insertion module 21. This conductive plastic part 24 is shaped so as to be positioned at the inlet of the insertion slot 221 so that the chip of the chip card comes into contact with this conductive plastic part 24. Besides, in this embodiment, the conductive plastic part 24 is shaped so that it does not contain any projecting ridge at the zone of contact with the card to enable smooth insertion. This makes it possible to avoid damaging the card when it is inserted. The conductive plastic part 24 furthermore comprises a linking rod 241. This linking rod connects the conductive plastic part 24 to at least one connection to the ground of said connector. In the embodiment shown in FIG. 2, this connection is made on one of the four pads 23.

In this embodiment, the resistance of the conductive plastic part 24 is of the order of a few hundreds of thousands of ohms or even a few $M\Omega$. The resistance should not be too low because that would cause a short circuit with the metal strips used to connect the card or at least there would be leakage resistance between the contacts. This would prevent the terminal from being approved by the official organizations (under the "Europay-MasterCard-VISA standard known as EMV). The resistance should not be too high because then the device would not be efficient during electrostatic discharges of a few kV. This means that the resistance should be balanced at about a few hundreds of $k\Omega$ across the contacts.

6.2.2 Second Embodiment

In this second embodiment, it is the memory card connector that is fully made out of conductive material but at a very low level of conduction (the surface resistance of the material should be of the order of $10^5$ to $10^6$ $\Omega$/square).

Whether it is in the first or second embodiment, it is proposed to make parts out of one of the following known materials:

SABIC Innovative Plastics LNP Stat-kon REP349 PA 66 (1.00e+7 to 1.00e+9 ohm/cm in values of volume resistance);

SABIC Innovative Plastics LNP Stat-kon LX04420C PEEK (1.00e+6 to 1.00e+8 ohm/cm in value of volume resistance);

Cool Polymers Coolpoly® D5502 Thermally Conductive Liquid Crystalline Polymer (1.00e+14 ohm/cm 1.00e+14 ohm/cm in value of volume resistance).

In the second embodiment, the material in addition to having these electrical characteristics must withstand a re-melting temperature and wear and tear associated with the rubbing of the cards.

6.2.3 Third Embodiment

In this embodiment, the discharge is carried out by the use of several parts made out of conductive plastic. The advantage of this embodiment is that it enables a gradual and non-aggressive discharge of the card. In this embodiment, the memory card connector comprises a plurality of parts made out of conductive plastic, each part made out of conductive plastic having a different surface resistance.

In one particular implementation of this embodiment, a first part positioned at the inlet to the memory card connector has a surface resistance of the order of $10^{12}$ $\Omega$/square. A second part positioned inside the memory card connector has a surface resistance of the order of $10^{10}$ $\Omega$/square. This second part comes into contact with the card after the discharging carried out by the first part. A third part, positioned inside the memory card connector, has a surface resistance of the order of $10^8$ $\Omega$/square.

This third part comes into contact with the card subsequently to the discharge carried out by the second part. Finally, according to one variant, the connector, in a zone situated just before the connector contacts, has a metal strip to finish the discharging of the card (this strip being connected to ground). Thus, rather than a sudden discharge of the card, the invention carries out a gradual discharge that can be complete and is even less likely to cause damage to the printed circuits.

The number of discharge phases can thus extend from three to five levels, depending on the maximum charges against which it must be protected and the fragility of the electronic circuitry.

Although the present disclosure has been described with reference to one or more examples, workers skilled in the art will recognize that changes may be made in form and detail without departing from the scope of the disclosure and/or the appended claims.

The invention claimed is:

1. A memory card connector comprising:
    an insertion module of a generally rectangular parallelepiped shape, said insertion module comprising a memory card insertion slot;
    several parts made out of conductive plastic configured to discharge gradually static electricity coming into contact with a portion of a surface of a memory card, at a contact zone, during insertion of said memory card into said memory card connector, each of said several parts having a different value of surface resistance.

2. The memory card connector according to claim 1, wherein said value of surface resistance ranges from $10^7$ $\Omega$/square to $10^{12}$ $\Omega$/square.

3. The memory card connector according to claim 1, wherein said value of surface resistance ranges from $10^5$ $\Omega$/square to $10^8$ $\Omega$/square.

4. The memory card connector according to claim 1, wherein said value of surface resistance is of the order of $10^7$ $\Omega$/square.

5. The memory card connector according to claim 1, wherein said value of surface resistance is of the order of $10^8$ $\Omega$/square.

6. The memory card connector according to claim 1, wherein said parts are formed integrally with said memory card connector.

7. The memory card connector according to claim 1, wherein said parts are placed at said insertion slot, said conductive plastic parts comprising at least one linking rod connecting said conductive plastic parts to at least one ground connection of said connector.

8. The memory card connector according to claim 1, wherein the several parts comprise:
    a first part of conductive plastic positioned at an inlet of the memory card connector;
    a second part of conductive plastic positioned inside the memory card connector so as to come into contact with the memory card after the memory card comes into contact with the first part of conductive plastic as the memory card is inserted into the insertion slot.

9. The memory card connector according to claim 8, wherein the several parts further comprise:
    a third part of conductive plastic positioned inside the memory card connector so as to come into contact with the memory card after the memory card comes into contact with the second part of conductive plastic as the memory card is inserted into the insertion slot.

* * * * *